May 1, 1945.  M. CASERTA  2,375,077

BY-PASS VALVE

Filed May 4, 1944

Inventor
Michele Caserta

Patented May 1, 1945

2,375,077

UNITED STATES PATENT OFFICE 2,375,077

BY-PASS VALVE

Michele Caserta, Detroit, Mich., assignor to Thompson Products, Inc., a corporation of Ohio Application May 4, 1944, Serial No. 534,062

5 Claims. (Cl. 277—45)

This invention relates to a by-pass valve particularly adapted for use in a relief and by-pass valve assembly in pumps such as those used for the transfer of fuel in aircraft.

The present invention constitutes an improvement over the by-pass valve construction described in my copending application Serial No. 512,891, filed December 4, 1943. In that application I have shown a nested assembly of elements constituting both a relief valve and a by-pass valve in a fuel pump for aircraft.

According to the present invention, the by-pass valve is so constructed as to be much more economical of manufacture and more efficient in operation. The by-pass valve is formed in two parts, one of which can be simply and economically made by a die-casting operation, and the other of which is a simple form of stamped metal member.

It is therefore an important object of this invention to provide a by-pass valve construction of an improved, simple and cheap construction that is efficient in operation.

Other and further important objects of this invention will be apparent from the disclosures in the specification and the accompanying drawing.

Figure 1:
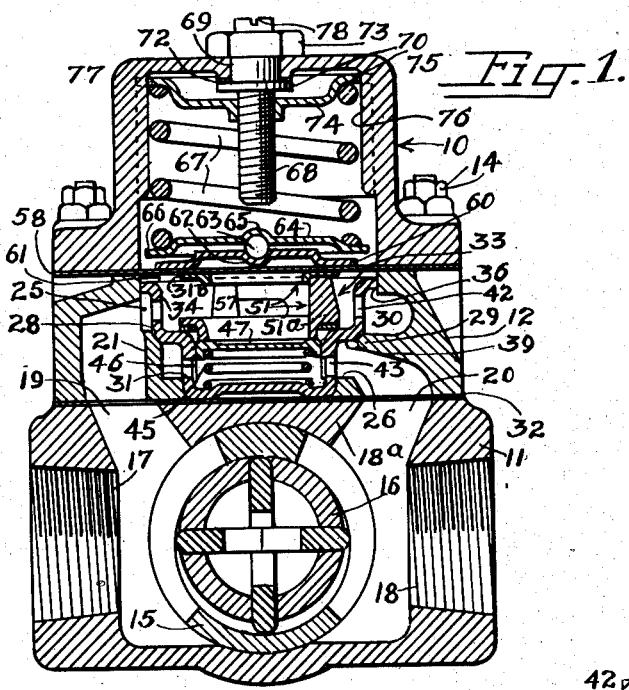
Figure 1 is a longitudinal sectional view of a fuel transfer pump with which a relief and by-pass valve assembly is illustrated.
Figure 4:
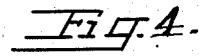
Figure 4 is a top plan view of the washer element of the by-pass valve.

The reference numeral 10 (Fig. 1) indicates generally an aircraft fuel pump with which a relief and by-pass valve assembly, indicated generally by the reference numeral 33, is adapted to be associated. Said pump 10 comprises a pump casing 11, a valve housing 12 mounted thereon, and a valve housing cover 13 secured to said housing 12 and to the pump casing 11 by means of bolts and nuts 14. The pump here illustrated is of the rotary vane type, the bore of the pump casing 11 being provided with a pump liner 15 within which a rotor 16 is adapted to be driven. The pump casing 11 is provided with an intake 17 and an outlet 18 for connecting the pump in a fuel line to an engine, or other point to which fuel is to be delivered. Internally, the pump casing is divided by a partition 18a, on the intake side of which is formed a port 19, and on the outlet side of which is formed a port 20, both of which are in valve controlled flow communication with interior portion 30 of the valve housing 12.

Said valve housing 12 is formed with an axially concentric, annular partition 21, which may be integrally cast with the valve housing 12. Said partition 21 provides one or more ports 25 in communication with the port 19 and the intake 17. On the outlet side of said annular partition 21, the partition is cut away, as at 26, to provide flow communication from the outlet port 20 to the interior of the annular partition 21. The inner upper edge of said partition 21 provides a relief valve seat 28, the full circumference of which is completed by a horizontally extending integral portion 29 of the valve housing 12. Within said partition 21 is formed an open cylindrical well 31 of reduced diameter for receiving the lower portion of the relief valve 34. A gasket 32, having openings conforming with the ports 19 and 20, is suitably positioned between the pump casing 11 and the valve housing 12 for providing a tight joint therebetween. The lower annular edge of the partition 21 rests directly upon said gasket 32, which is clamped between said lower edge and the partion 18a of the pump housing.

Figure 3:
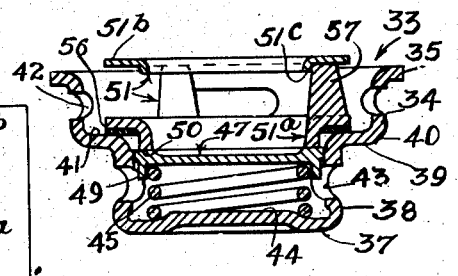
Figure 3 is a sectional view of the relief and by-pass valve assembly in nested relationship.
Figure 2:
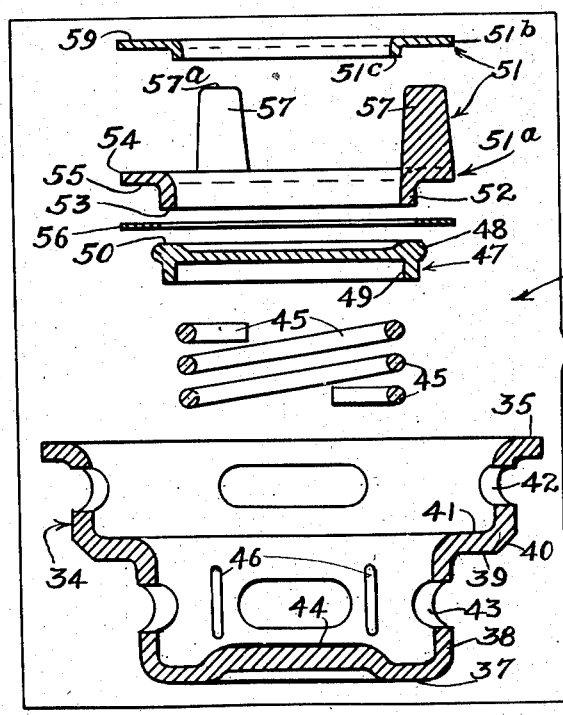
Figure 2 is an enlarged sectional, exploded view of the relief and by-pass valve assembly showing the construction of my improved by-pass valve.

The relief and by-pass valve assembly 33 (Figs. 2 and 3) is adapted to be assembled in nested relationship within the valve housing 12. Said assembly comprises a relief valve 34, suitably formed of a metal stamping with an upper, out-turned cylindrical flange 35 in sliding contact with the cylindrical bore 36 formed in the upper portion of said valve housing 12, and with a lower closed bottom portion 37 having an upstanding cylindrical side wall 38 slidable within the well 31. Said relief valve 34 is further formed with an intermediate offset portion 39, provided on its outer surface with a beveled seating face 40, and on its inner surface with a flattened shoulder 41. Above the offset portion 39, the side wall of the relief valve 34 is provided with ports 42, while ports 43 are formed in the lower side wall. The bottom wall 37 of said relief valve is provided with an upwardly dished central portion 44 for the purpose of centering a coiled spring 45, adapted to rest thereon. The lower side wall of said relief valve 34 is provided with inwardly extending ribs 46, which are parallel to the axis of said relief valve and which serve for guiding a by-pass valve disk 47, as will later be explained in greater detail.

The by-pass valve disk 47 is formed with an upper disk-like portion presenting an outer periphery 48 for sliding engagement with said ribs 46, and with a lower dependent annular flange 49 for partially enclosing and confining the upper end of said upper coiled spring 45. The by-pass valve disk 47 is also provided, on its upper face, with a raised, flat annular surface 50 which constitutes the seating surface of the disk, as will later be explained.

A by-pass valve 51 formed in two parts and comprising a lower member 51a and an upper washer 51b, is adapted to be nested within the relief valve 34 to provide a seat for the by-pass disk 47. Said member 51a is formed with a dependent annular flange 52 having an outside diameter equal to the diameter of the circle defined by the inwardly extending ribs 46. The lower surface of said flange 52 provides a plane annular face 53 against which said by-pass valve disk 47 is adapted to be urged by the spring 45. Above said dependent annular flange 52, the by-pass valve 51 is provided with an annular shoulder 54, the bottom face 55 of which is plane and adapted to rest upon and be supported by the shoulder 41 of the relief valve 34. A thin washer 56 of flexible material, may suitably be positioned between the shoulders 55 and 41 to insure a seal therebetween. The lower portion 51a of the by-pass valve 51 is provided with a plurality of upstanding pillars 57, which are of similar tapered construction with flat tops 57a and which are spaced peripherally about said by-pass valve part 51a. The free flow of fluid from the upper chamber 30 of the valve housing 12 is thus permitted through the spaces between said pillars 57 to the interior of said relief valve 51 above the by-pass disk 47. The washer 51b is adapted to rest upon and be centered on the tops 57a of said pillars 57, and for this purpose the washer 51b is provided with an inner, downwardly extending flange 51c that fits over the inner edges of said pillars 57.

When the rotor 16 is not operating and it is necessary to by-pass fluid around said rotor, the fuel can be caused to flow under pressure, as by means of an emergency hand pump (not shown), up through the port 19, through the corresponding port 25 in the valve housing 12, through the ports 42 in the relief valve 34 and through the ports or spaces between the pillars 57 of the by-pass valve 51 to act against the by-pass disk 47. Since the spring 45 is relatively very light, being merely sufficient to hold the by-pass disk 47 against its seat when the fluid pressure above and below the by-pass disk is substantially the same, said by-pass disk 47 is depressed under the conditions assumed to permit the fuel to continue in its flow through the opening thereby provided and out through the ports 43, 26 and 20 to the outlet side 18 of the pump casing.

In the operation of the by-pass disk 47, there is no tendency of the disk to become cocked and stuck, since the outer peripheral surface 48 is rounded (Fig. 2) to give the effect of a thin circular disk rather than that of a piston. Furthermore, the coiled spring 45 acts upwardly against the under side of said disk with a pressure that is uniformly distributed about its complete circumference and adjacent its outer periphery. The spring 45 is itself centered by the upstanding central portion 44 in the closed bottom 37 of the relief valve 34, and its top winding is confined within the dependent flange 49 of said by-pass disk 47, so that the spring cannot easily be displaced. In addition, the amount by which the spring 45 can be compressed is limited by the lower dependent flange 49 of the by-pass disk 47 striking against the closed bottom wall 37 of the relief valve 34, so that the spring 25 can never be compressed beyond its elastic limits.

As a matter of fact, the movement of the by-pass disk 47 is very slight in actual practice, since the opening that is uncovered is of such large diameter as to permit substantially unobstructed flow of the fuel upon slight depression of the by-pass disk.

Between the valve housing cover 13 and the valve housing 12, a diaphragm 58 is clamped about its periphery by the same bolts 14 that hold the pump casing 11, valve housing 12 and cover 13 together. With the relief valve 34 properly seated, the upper face 59 of the washer 51b forming part of the by-pass valve 51 is in touching contact with said diaphragm 58.

A stamped washer 60 is positioned above said diaphragm 58 to rest thereagainst with its downwardly offset peripheral portion 61 opposing the upper annular surface 59 of said by-pass valve washer 51b. Said disk 60 is further formed with a semi-spherical, centrally depressed portion 62 for receiving a ball 63. A second stamped metal disk 64 is formed with a complementary semi-spherical portion 65 which rests against said ball 63 to be centered thereby. Said disk 64 is also provided with a downwardly offset peripheral portion 66 which forms a seat for the bottom turn of a regulating spring 67 for adjusting the pressure against said diaphragm 58.

The regulating mechanism includes a screw 68, which is adapted to extend through an opening 69, in the top of said cover 13. Said screw 68 is provided with an integral flange 70, between which and the underside of the cover 13 is positioned a gasket 72. A check-nut 73 serves to draw the flange and gasket tightly up against the under surface of the top wall of the cover 13 to provide a fluid-proof seal. A flanged disk 74 is operatively threaded upon the lower end of said screw 68 and is provided with an offset peripheral flange 75 for bearing against the upper end of the coiled spring 67. For the purpose of guiding said disk 74, a plurality of longitudinally extending integral ribs 76 are formed on the inside of the side wall of said cover 13, and the peripheral flange 75 of said disk 74 is slotted as at 77 for sliding engagement with said ribs. The screw 68 is further provided with a screw-driver slot 78, by means of which the desired adjustment can be made from the outside, without removing the cover 13 or any accessory thereto.

To accomplish the adjustment of the regulating spring 67, and thereby regulate the amount of pressure exerted downwardly against the diaphragm 58, it is merely necessary to loosen the check nut 73 and turn the screw 68 in the desired direction. By virtue of the threaded engagement between the disk 74 and the threaded portion of the screw 68, said disk 74 will be moved upwardly or downwardly to lessen or increase the compression force of the spring 67. The slidable engagement between the ribs 76 of the cover 13 and the slotted periphery 77 of the disk 74 prevents said disk from turning and insures a positive downward pressure against the spring 67.

Furthermore, any tendency of one end of the spring 67 to be deflected from the horizontal due to movement of the disk 74 is neutralized by reason of the free mobility of the disk 64 about the ball 63. As a result, only the axial component of the tension of the spring is transmitted, without any interfering factors, through the disk 64, the ball 63 and the disk 60 to the diaphragm 58. The downward pressure on the diaphragm is further transmitted through the by-pass valve 51 to the relief valve 34, through the gasket 56, whereby the relief valve is held against its seat 41 with the desired pressure.

In case the pressure tends to build up beyond that for which the relief valve is set, the fluid pressure acting upwardly against the offset portion 39 of said relief valve 34 and against the under side of the by-pass disk 47 will tend to lift the relief valve 34 off of its seat 28, and fluid will pass into the cavity 38 and through the ports 42 and 25 into the port 19 on the intake side of the pump. Fluid also passes through the port 43 in the lower portion of the relief valve 34 and out through the opening provided when the seat 28 is uncovered. Since the opening provided when the valve 34 is lifted off of its seat 28 is of relatively large diameter, the valve need be lifted only slightly to provide for the flow of a considerable volume of the fuel from the outlet to the intake side of the pump.

Returning to the by-pass valve 51, the lower valve element 51a can be simply formed in a die-casting operation out of aluminum or other light metals or alloys. For ease of die-casting, the pillars 57 are given a tapered form. The washer 59 is formed by a simple stamping operation from a metal ring or annulus. This construction is much simpler and less costly of manufacture than the integral, one-piece by-pass valve illustrated in my pending application Serial No. 512,891.

It will, of course, be understood that various details of construction may be varied through a wide range without departing from the principles of this invention and it is, therefore, not the purpose to limit the patent granted thereon otherwise than necessitated by the scope of the appended claims.

What I claim is:

1. A relief and by-pass valve assembly, comprising a relief valve member, having a closed bottom, an annular shoulder and a ribbed cylindrical wall provided with ports, a by-pass valve nesting inside said relief valve to seat against said annular shoulder and having circumferentially spaced upstanding pillars and a lower annular seating surface, a by-pass disk beneath said by-pass valve, a spring between said closed bottom and said disk for urging the latter against said seating surface, and an annular washer seated on said pillars to transmit forces from a diaphragm to said by-pass valve to seat said by-pass valve.

2. In a diaphragm type relief and by-pass valve assembly, a by-pass valve comprising a ring-like member having a lower annular seating surface and peripherally spaced upstanding pillars, and an annular washer adapted to be mounted on the tops of said pillars and having an inner downwardly turned circular flange for centering said washer upon said pillars, said washer transmitting forces from the diaphragm to said by-pass valve to effect a seating thereof under the desired pressure.

3. In a diaphragm type relief and by-pass valve assembly, a by-pass valve comprising a ring-like member having a lower annular seating surface and peripherally spaced upstanding pillars affording fluid flow ports therebetween, a relief valve member having a shoulder against which said annular seating surface is adapted to be seated, and an annular washer adapted to be mounted on the tops of said pillars and having an inner downwardly turned circular flange for centering said washer upon said pillars, said washer transmitting forces from the diaphragm to said by-pass valve to effect a seating thereof against said shoulder under the desired pressure.

4. A by-pass valve comprising a die-cast ring-like member having a lower annular seating surface and a plurality of peripherally spaced upstanding pillars, and an annular washer having an inner downwardly turned flange for centering said washer on top of said pillars.

5. A by-pass valve comprising a die-cast ring-like member having a pair of axially spaced lower annular seating surfaces and a plurality of peripherally spaced upstanding pillars, and an annular washer having an inner downwardly turned flange for centering said washer on top of said pillars.

MICHELE CASERTA.